US012803173B2

(12) United States Patent
Koga et al.

(10) Patent No.: US 12,803,173 B2
(45) Date of Patent: Nov. 17, 2026

(54) SLOT ANTENNA AND WIRELESS COMMUNICATION DEVICE

(71) Applicant: National Institute of Information and Communications Technology, Tokyo (JP)

(72) Inventors: Yohei Koga, Tokyo (JP); Yuichiro Yano, Tokyo (JP); Nobuyasu Shiga, Sunnyvale, CA (US); Satoshi Yasuda, Tokyo (JP); Motoaki Hara, Tokyo (JP); Tetsuya Ido, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 40 days.

(21) Appl. No.: 19/019,898

(22) Filed: Jan. 14, 2025

(65) Prior Publication Data

US 2026/0204790 A1 Jul. 16, 2026

(51) Int. Cl.
*H01Q 13/10* (2006.01)
*H01Q 1/48* (2006.01)

(52) U.S. Cl.
CPC ............... *H01Q 13/10* (2013.01); *H01Q 1/48* (2013.01)

(58) Field of Classification Search
CPC ............ H01Q 1/22; H01Q 1/243; H01Q 1/38; H01Q 1/48; H01Q 1/52; H01Q 13/10; H01Q 9/0407; H01Q 5/378–392
See application file for complete search history.

(56) References Cited

U.S. PATENT DOCUMENTS

| | | | | |
|---|---|---|---|---|
| 6,985,108 B2 * | 1/2006 | Mikkola | H01Q 9/0442 343/702 |
| 7,079,079 B2 * | 7/2006 | Jo | H01Q 9/0442 343/702 |
| 7,439,929 B2 * | 10/2008 | Ozkar | H01Q 9/145 343/846 |
| 7,932,863 B2 * | 4/2011 | Pros | H01Q 9/0421 343/702 |
| 8,525,734 B2 * | 9/2013 | Krogerus | H01Q 1/243 343/702 |
| 8,531,337 B2 * | 9/2013 | Soler Castany | H01Q 1/242 343/702 |
| 11,264,711 B2 * | 3/2022 | Shamblin | H01Q 5/378 |
| 2014/0085159 A1 * | 3/2014 | Wong | H01Q 1/243 343/843 |

OTHER PUBLICATIONS

Koga et al., "Folded Slot Antenna with Floating Metal for Precise Ranging using Wireless Communication", The IEICE Transactions on Communications (Japanese Edition), pp. 390-403, vol. J107-B, No. 07, Jul. 2024.

* cited by examiner

*Primary Examiner* — Hasan Islam
(74) *Attorney, Agent, or Firm* — GRUMBLES LAW PLLC; Brittany Haanan

(57) ABSTRACT

A slot antenna includes a ground that is sheet shaped and includes a slot, an antenna element disposed within the slot; and a parasitic element that is sheet shaped and disposed parallel to the ground. The parasitic element includes a slit.

9 Claims, 19 Drawing Sheets

SLOT ANTENNA AND WIRELESS COMMUNICATION DEVICE

BACKGROUND

Technical Field

The disclosure relates to a slot antenna and a wireless communication device.

Related Art

In Beyond 5G/6G, precise position measurement and spatial recognition that use wireless communication are being considered. Wireless two-way interferometry (Wi-Wi) that utilizes a carrier phase is a promising technique for precision position measurement and spatial recognition.

When the carrier phase is utilized, a phase of a radio wave radiated by an antenna of a wireless terminal must be managed with accuracy. It is known, however, that radiation of the radio wave is not isotropic. More specifically, with a conventional wireless communication module, a phase change of up to ±60 degrees may occur depending on a direction of radiation of the radio wave. A change in the phase of the radio wave depending on the direction of radiation thereof causes a variation in a distance measurement due, for example, to an apparent distance changing depending on an inclination of the wireless terminal.

Non-Patent Literature 1 discloses a conventional technique proposed for reducing a phase change of a radio wave (Non-patent Literature 1: Koga et al., "Folded Slot Antenna with Floating Metal for Precise Ranging using Wireless Communication," Vol. J107-B, No. 07, July 2024). This conventional technique uses a slot antenna with a floating metal. By adjusting a size and position of the floating metal, phase is compensated in accordance with a radiation angle of the radio wave.

With the above-described conventional technique, a size of the antenna depends on a wavelength of the radio wave, making it difficult to make the antenna small. For example, with the conventional technique, when an unlicensed sub-GHz frequency band is used, a height, width, and thickness of the antenna become 30 cm, 30 cm, and 2 cm, respectively, making the antenna large.

SUMMARY

A slot antenna includes a ground that is sheet shaped and includes a slot, an antenna element disposed within the slot, and a parasitic element that is sheet shaped and includes a slit. The parasitic element is disposed parallel to the ground.

A wireless communication device includes the slot antenna and a wireless communication unit disposed on the ground.

DETAILED DESCRIPTION

Figure 1:
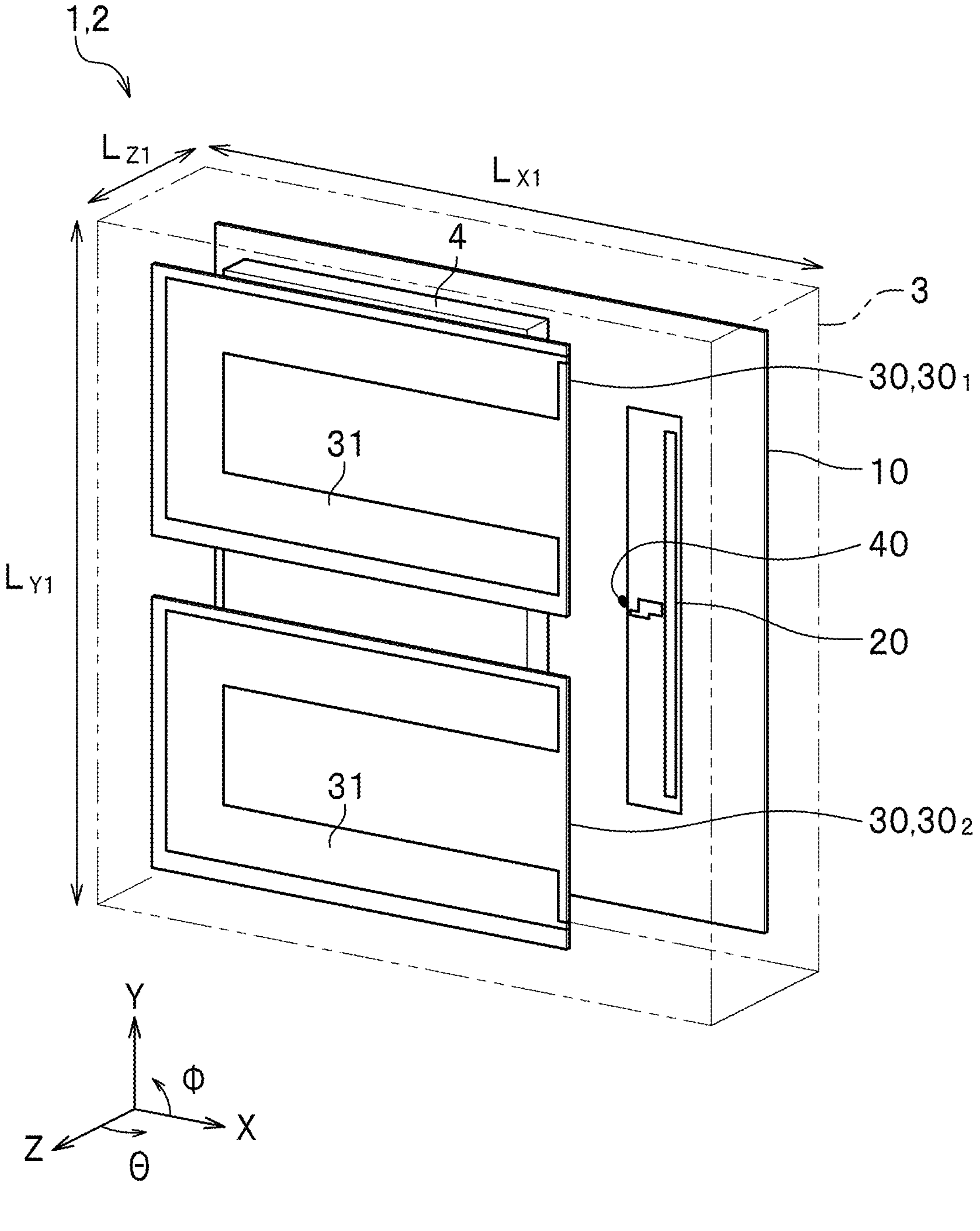
FIG. 1 is a schematic diagram of a wireless communication device according to an embodiment.

In the following detailed description, for purposes of explanation, numerous specific details are set forth in order to provide a thorough understanding of the disclosed embodiment. It will be apparent, however, that one or more embodiments may be practiced without these specific details. In other instances, well-known structures and devices are schematically shown in order to simplify the drawing.

Hereinafter, an embodiment showing an example of the disclosure will be described with reference to the drawings. However, the embodiment described below is intended to embody a technical idea of the disclosure. The disclosure is not limited to the following unless specified to be otherwise. The same means are denoted by the same reference signs and a description thereof may be omitted.

An object of an embodiment is to provide a slot antenna and a wireless communication device that are small and may reduce a phase change.

Wireless Communication Device

An overview of a wireless communication device 1 according to an embodiment will be described with reference to FIG. 1. FIG. 1 shows an X-axis that is along a horizontal direction, a Y-axis that is along a vertical direction, and a Z-axis that is along a direction of depth. The Z-axis is an axis that is perpendicular to a ground 10 and a parasitic element 30 that will be described later.

As shown in FIG. 1, the wireless communication device 1 includes a slot antenna 2, a housing 3, and a wireless communication unit 4, which will be described later. For example, the wireless communication device 1 radiates a radio wave that is used in the 5th generation mobile communication (5G). Hereinafter, a wavelength of the radio wave radiated by the wireless communication device 1 is referred to as λ.

The housing 3 is a box-shaped housing that houses the slot antenna 2 and the wireless communication unit 4. For example, the housing 3 may be formed of acrylic.

The wireless communication unit 4 is a wireless communication module such as Wi-Wi. The wireless communication unit 4 may be arranged at any position on the ground 10. For example, the wireless communication unit 4 may be disposed behind a parasitic element 30, which will be described later, when viewed from the Z-axis. To keep drawings simple, the wireless communication unit 4 may be omitted in some drawings.

Slot Antenna

A configuration of a slot antenna 2 according to an embodiment will be described with reference to FIGS. 2 to 6.

Figure 2:
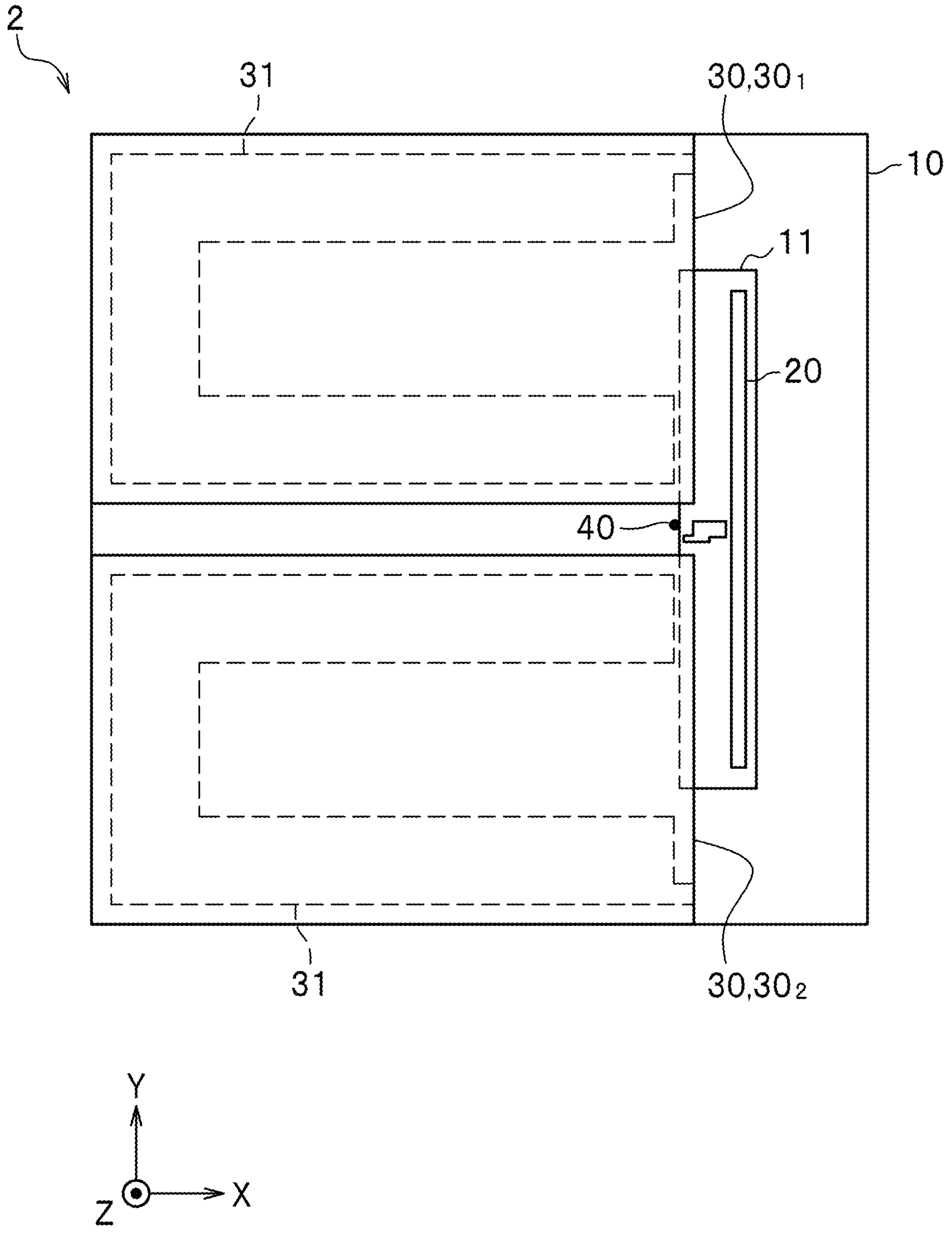
FIG. 2 is a diagram of a slot antenna as viewed from a Z-axis.

As shown in FIG. 2, the slot antenna 2 includes a ground 10, an antenna element 20, a parasitic element 30 ($30_1$, $30_2$), and a feeding point 40.

Figure 3B:
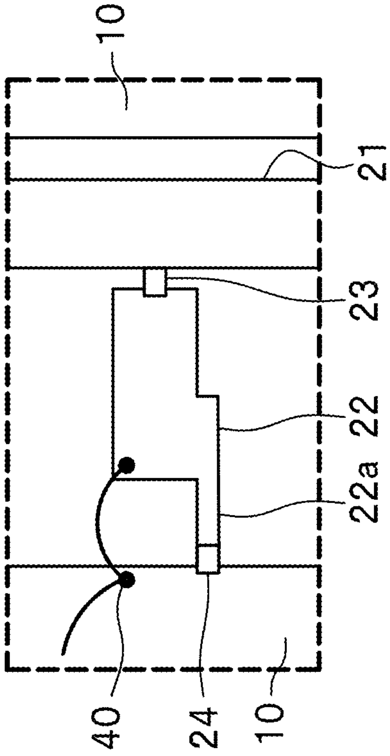
FIG. 3B is an enlarged view of a portion surrounded by a broken line in FIG. 3A.
Figure 3A:
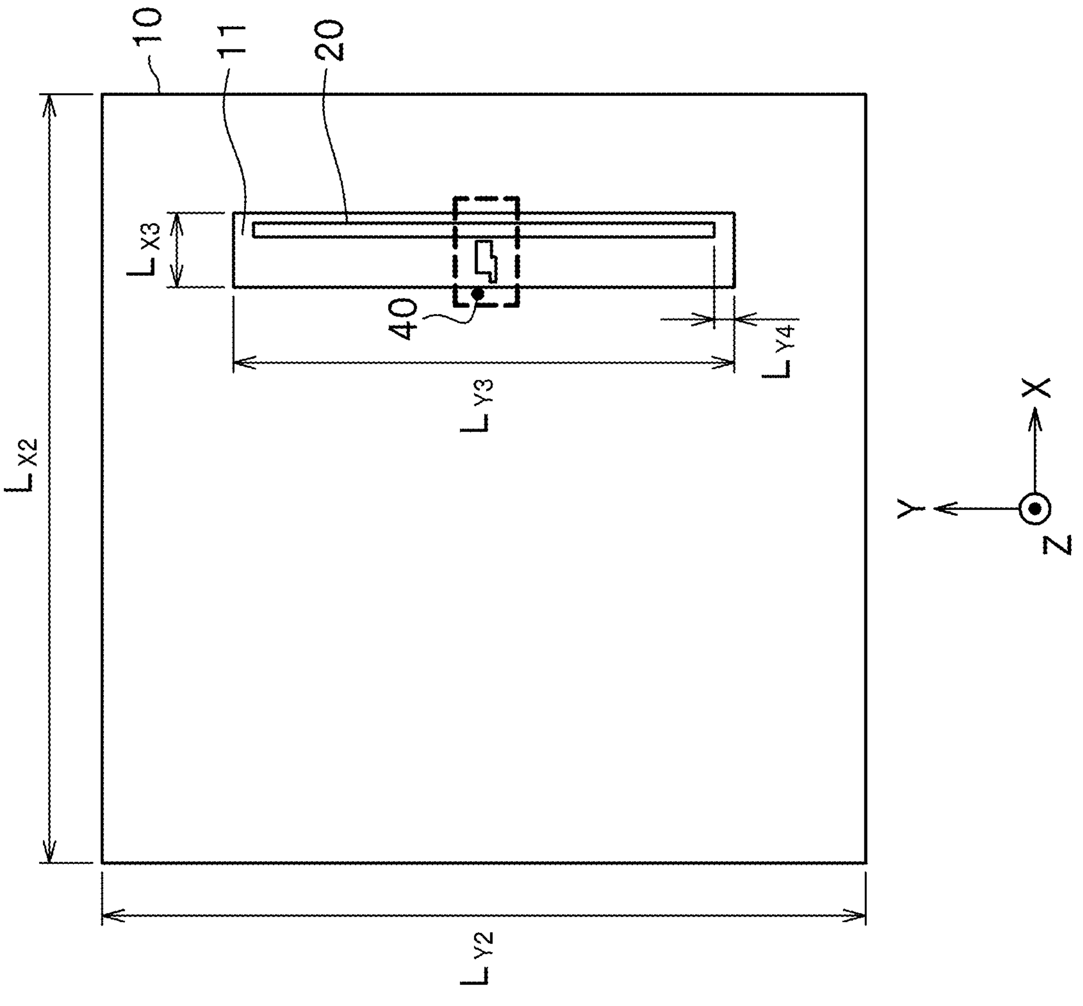
FIG. 3A is a diagram of a ground as viewed from the Z-axis.

As shown in FIG. 3A, the ground 10 is a sheet-shaped member including a slot 11. The ground 10 is square-shaped when viewed from the Z-axis. A shape of the ground 10 may not be limited to a square. The shape of the ground 10 may be a polygon. The ground 10 may, for example, be a substrate including an epoxy substrate and a metal layer (for example, copper) laminated on one side of the epoxy substrate. In one or more embodiments, the ground 10 may be a single metal plate (for example, a copper plate). When a size of the ground 10 (a length of one side [edge] of the ground 10) is equal to or greater than λ, the ground 10 radiates radio waves and an influence on the phase increases. Therefore, the size of the ground 10 may be made smaller than λ.

The ground 10 includes a slot 11 that is rectangular in shape. The slot 11 forms a rectangle that is long in length along a direction of the Y-axis and short in length along a direction of the X-axis. In a portion of the ground 10 where the slot 11 is formed, metal such as copper is not present. For example, in a case where the ground 10 is a substrate, a metal is not laminated on the portion where the slot 11 is formed, and an epoxy substrate is exposed in that portion. In a case where the ground 10 is a metal plate, the slot 11 is a through hole that penetrates the ground 10 in a direction of the Z-axis.

The antenna element 20 is disposed within the slot 11. The antenna element 20 is rectangular in shape when viewed from the Z-axis, and the rectangular shape includes long sides (edges) along a direction of the Y-axis and short sides (edges) along a direction of the X-axis. (In other words, the long sides are parallel to the Y-axis, and the short sides are parallel to the X-axis.) For example, a length of the antenna element 20 in a lengthwise direction may be less than or equal to 0.5λ, and may be made to be 0.184λ by providing a matching circuit that will be described later.

The antenna element 20 is disposed in the slot 11 so that it does not come in contact with the ground 10. For example, in a case where the ground 10 is a substrate, the antenna element 20 is disposed in the slot 11 so that it does not come in contact with the metal layer (such as copper) that is laminated on the epoxy substrate. That is, in the slot 11, there is a space provided between the ground 10 (a ground plane) and the antenna element 20. For example, a depression may be provided in the housing 3, and the antenna element 20 may be held by the depression.

As shown in FIG. 3B, the antenna element 20 includes a first antenna element 21, a second antenna element 22, a first capacitor 23, and a second capacitor 24. The first capacitor 23, and the second capacitor 24 are a matching circuit of the antenna element 20. The first antenna element 21 is rectangular in shape with a long side (edge) along a direction of the Y-axis and a short side (edge) along a direction of the X-axis (in other words, the long side is parallel to the Y-axis and the short side is parallel to the X-axis), and a size of the first antenna element 21 is such that the first antenna element 21 fits in the slot 11. The second antenna element 22 is a small component that is positioned at a central portion of the antenna element 20 along a direction of the Y-axis. The second antenna element 22 includes an extension portion 22*a* that extends from a center thereof along a direction of the X-axis. The first capacitor 23 is disposed to connect the first antenna element 21 and the second antenna element 22. The second capacitor 24 is disposed to connect the extension portion 22*a* of the second antenna element 22 and the ground 10. The antenna element 20 may, instead of the first capacitor 23 and the second capacitor 24, include an inductor as the matching circuit.

The antenna element 20 is connected to the feeding point 40 at the central portion along a direction of the Y-axis. That is, the antenna element 20 is a feed element that receives power from the feeding point 40 and radiates a radio wave in a direction of the Z-axis. As shown in FIG. 3B, the feeding point 40 is formed so as to straddle a gap between the ground 10 and the second antenna element 22. For example, when power is supplied by a coaxial cable, an inner conductor of the coaxial cable is connected to the second antenna element 22 and an outer conductor of the coaxial cable is connected to the ground 10.

Figure 4:
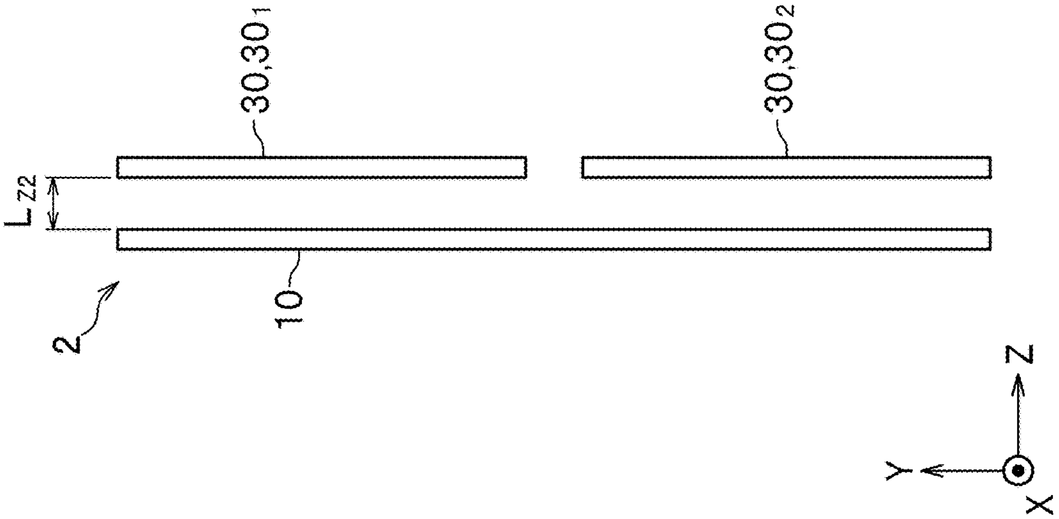
FIG. 4 is a diagram of the slot antenna as viewed from an X-axis.
Figure 5:
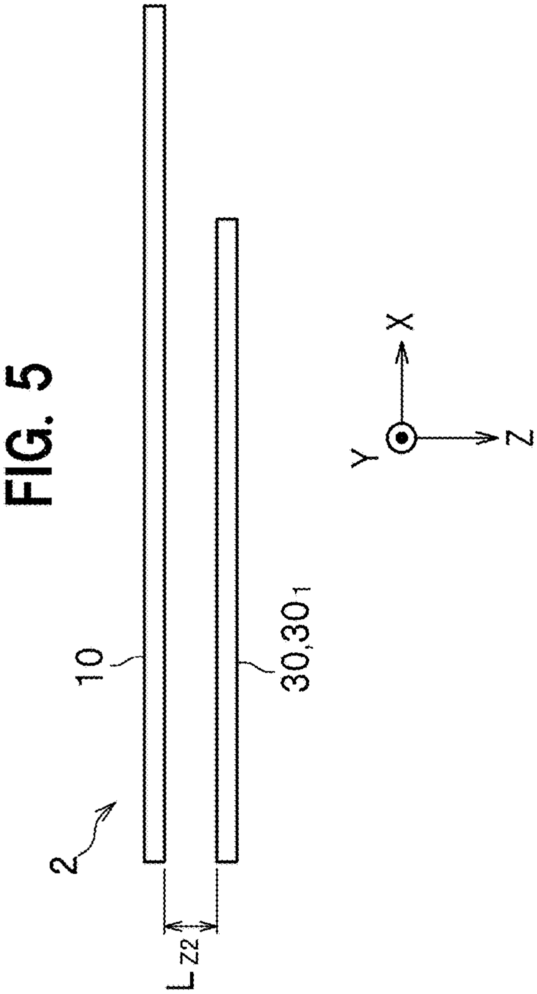
FIG. 5 is a diagram of the slot antenna as viewed from a Y-axis.

As shown in FIG. 2, the parasitic element 30 is a sheet-shaped member disposed parallel to the ground 10. The parasitic element 30 may be referred to as a floating metal. Two parasitic elements 30 are arranged along a long side of the antenna element 20 when viewed from the Z-axis. That is, the parasitic element 30 is configured from two parasitic elements $30_1$ and $30_2$ that are arranged one above the other in a direction of the Y-axis. As shown in FIGS. 4 and 5, the parasitic element 30 is separated from the ground 10 by a distance $L_{Z2}$.

When viewed from the Z-axis, a parasitic element 30 is rectangular in shape with four sides (edges) and is disposed so as not to protrude from the ground 10. A length of the parasitic element 30 parallel to the X-axis may be greater than or equal to 0.5λ. A length of the parasitic element 30 parallel to the Y-axis may be less than or equal to 0.5 λ.

As shown in FIG. 2, a parasitic element 30 includes a slit 31. The parasitic element 30 includes a slit 31 that runs along an outer periphery of the parasitic element 30 on three of its sides. The slit 31 includes horizontal portions that run along opposite sides of the parasitic element 30 and a vertical portion that connects the horizontal portions to each other, forming a C shape. For example, similar to the ground 10, the parasitic element 30 is a substrate or a single metal plate. For example, in a case where the parasitic element 30 is a substrate, an area where the slit 31 is formed is not laminated by a metal, and an epoxy substrate is exposed in a slit shape. In this case, the slit 31 is formed on a plane that faces the ground 10. In FIG. 2, the slit 31 is shown by a broken line because the slit 31 is hidden by the epoxy substrate when viewed from the Z-axis. In a case where the parasitic element 30 is a metal plate, the slit 31 is a through hole that penetrates the parasitic element 30 in a direction of the Z-axis.

A slit 31 is formed on the parasitic element 30 so that the slit 31 runs along three of the four sides of the parasitic element 30. The three sides of the parasitic element 30 that the slit 31 runs along exclude a side that is closest to the slot 11. That is, in the parasitic element 30, two ends of the slit 31 are positioned on the side closest to the slot 11. The parasitic element 30 is disposed such that an end of the slit 31 and a long side (edge) of the slot 11 are close to each other when viewed from the Z-axis.

Figure 6A:
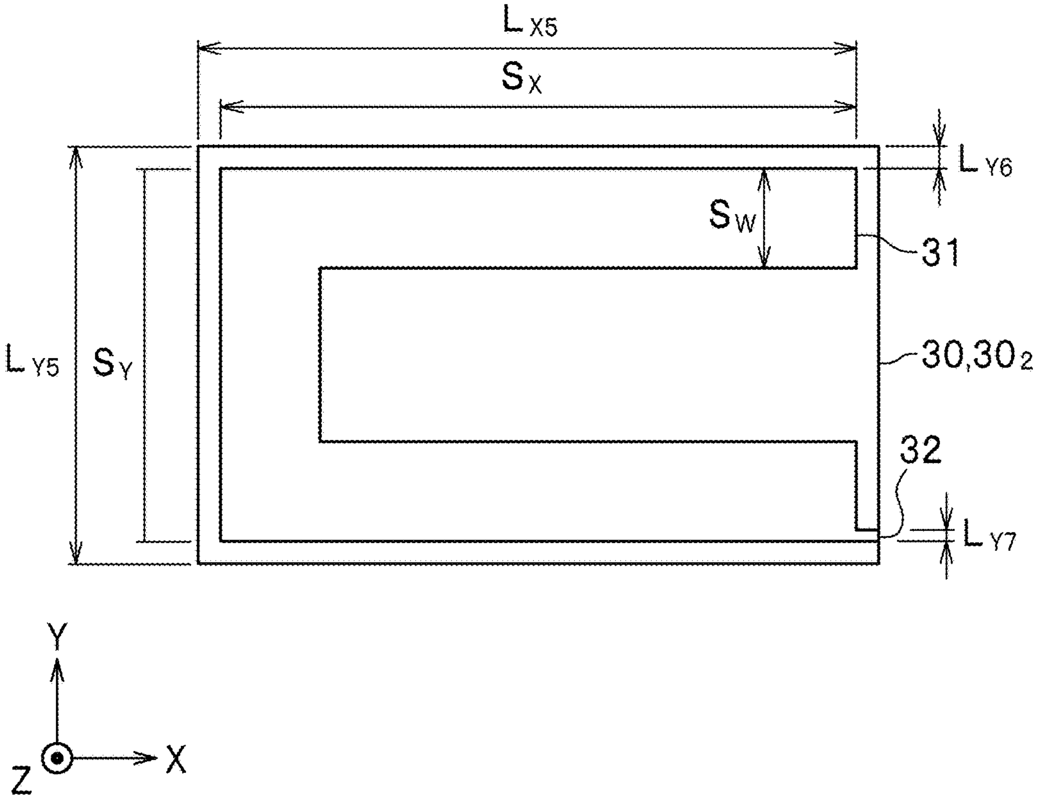
FIG. 6A is a diagram of a parasitic element as viewed from the Z-axis.

A sum of a length and width of the slit 31, as shown in FIG. 6A, is greater than 2 λ/4 and is less than or equal to 3 λ/4. A length of the slit 31 along the X-axis is $S_X$, a length of the slit 31 along the Y-axis is $S_Y$, and a width of the slit 31 is $S_W$. In this case, a length of an outer periphery of the slit 31 satisfies the following Expression (1) so that parallel resonance (2 λ/4) does not occur and series resonance (3 λ/4) does occur.

$$2\ \lambda/4 < 2\times S_X + S_Y + S_W \leq 3\ \lambda/4 \qquad \text{Expression (1)}$$

Figure 6B:
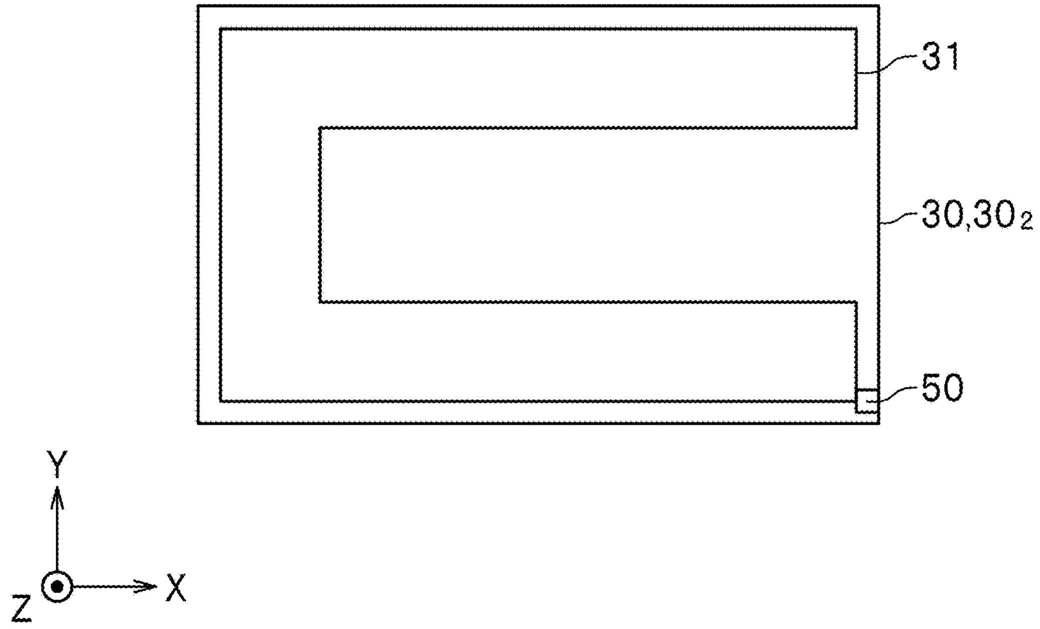
FIG. 6B is a diagram of a parasitic element that includes an inductor.

The slit 31 includes a gap 32 that penetrates the parasitic element 30 in a direction of the X-axis at at least one of the two ends. As shown in FIG. 6B, the parasitic element 30 may include an inductor 50 at one end of the slit 31. That is, the inductor 50 is disposed so as to cover the gap 32 of the slit 31 when viewed from the Z-axis. In one or more embodiments, the slit 31 may include the gap 32 at each of the two ends and two inductors 50 may be disposed at each of the two ends.

As shown in FIG. 6A and FIG. 6B, in the lower parasitic element $30_2$, a gap 32 is formed at the lower end of the slit 31 and an inductor 50 is disposed over the gap 32. Similarly, in the upper parasitic element $30_1$, a gap may be formed at the upper end of the slit 31 and an inductor may be disposed over the gap.

Effects

As described above, the slot antenna 2 may adjust a phase of the radio wave and reduce a phase change by causing the slit 31 to resonate and re-radiate the radio wave.

Further, in the slot antenna 2, the slit 31 is formed along an outer periphery of the parasitic element 30 so that the slit 31 forms a C-shape. This enables the slit 31 to become short along the X-axis, enabling the slot antenna 2 to be miniaturized.

Further, in the slot antenna 2, a sum of the length of the outer periphery of the slit 31 and the width of the slit 31 is greater than 2 λ/4 and less than or equal to 3 λ/4. This enables electric field coupling to occur between the antenna element 20 and the slit 31, causing a current with a wavelength of 3 λ/4 to flow along an outer peripheral portion of the slit 31, enabling the slit 31 to resonate easily.

Further, the slot antenna 2 includes an inductor 50 at an end of the slit 31. This enables a phase characteristic of the antenna element 20 to be improved, enabling the phase of the radio wave to be adjusted more easily.

Further, in the slot antenna 2, two parasitic elements 30 are disposed so that, when viewed from the Z-axis, the two parasitic elements 30 are disposed along a long side of the antenna element 20. When viewed from the Z-axis, an end of the slit 31 and a long side of the slot 11 are close to each other. In this way, in the slot antenna 2, the slit 31 may resonate more easily.

Further, in the slot antenna 2, the antenna element 20 includes a matching circuit. This enables the antenna element 20 to be shortened along the Y-axis. A size of the slot antenna 2 may therefore be reduced.

Example

Hereinafter, an example of the slot antenna 2 will be described. In the following example, it is assumed that a wavelength λ of the radio wave is 326 nm (a frequency of 920 MHz). It is needless to say that the slot antenna may not be limited to the following example.

Size of Slot Antenna

A size of the slot antenna 2 will be described.

As shown in FIG. 1, a height $L_{Y1}$, a width $L_{X1}$, and a thickness $L_{Z1}$ of the slot antenna 2 (housing 3) are 114 mm, 114 mm, and 30 mm respectively. An antenna described in prior art has a height, a width, and a thickness of 30 cm, 30 cm, and 2 cm respectively. Thus, the slot antenna 2 according to an embodiment may be made smaller compared to prior art by approximately 80% in terms of volume.

A height $L_{Y2}$, a width $L_{X2}$, and a thickness of the ground 10, as shown in FIG. 3A, are 100 mm, 100 mm, and 1 mm respectively ($L_{Y2}=L_{X2}=0.306\lambda$). A height $L_{Y3}$ and a width $L_{X3}$ of the slot 11, also as shown in FIG. 3A, are 66 mm and 10 mm respectively ($L_{Y3}=0.184\lambda$). A distance $L_{Y4}$ between a lower end of the antenna element 20 and the ground 10, also as shown in FIG. 3A, is 3 mm. A distance $L_{Z2}$ between the parasitic element 30 and the ground 10, as shown in FIGS. 4 and 5, is 10 mm.

Presence or Absence of Slit

A presence or absence of the slit 31 will be described.

Figure 7:
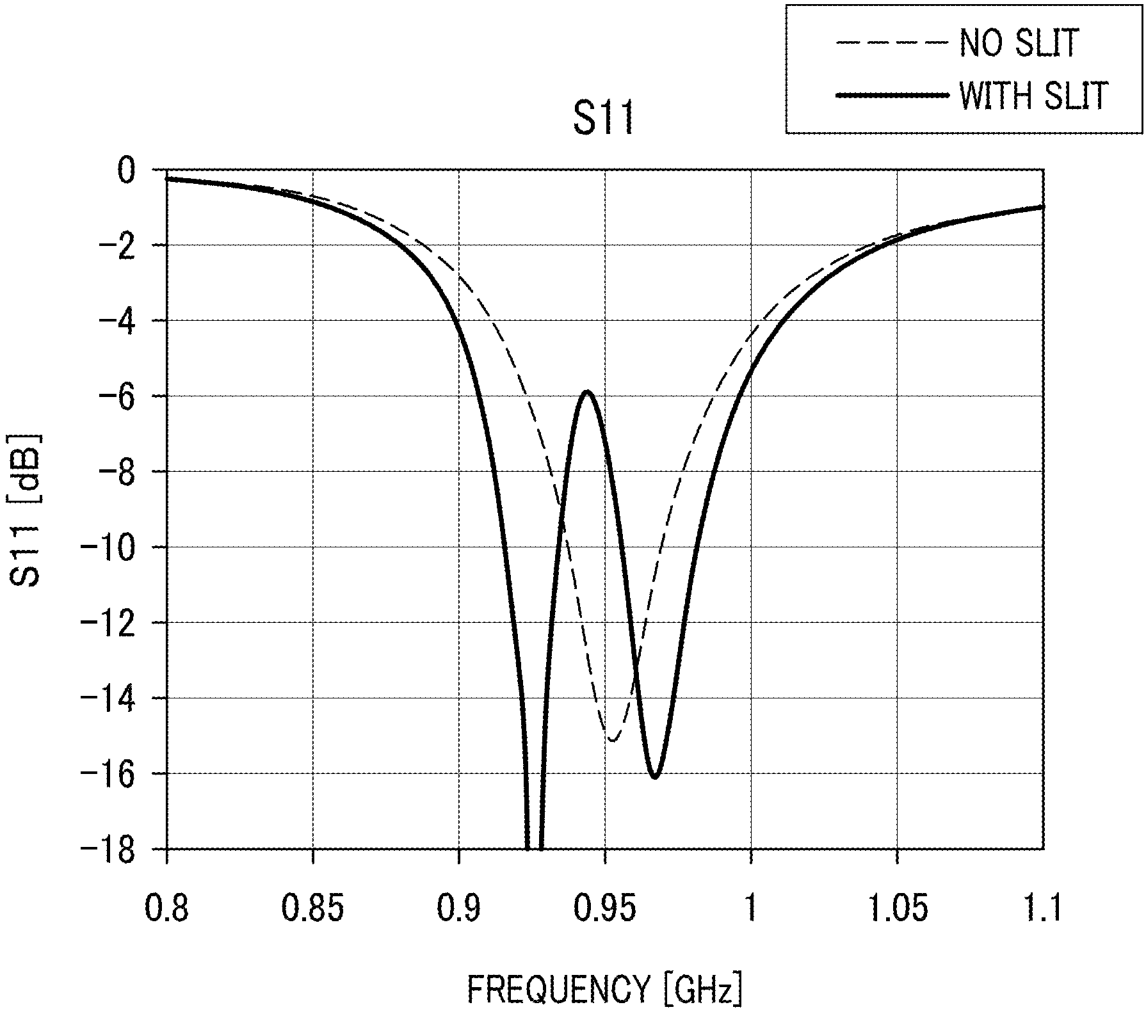
FIG. 7 is a graph showing a relationship between an S-parameter and frequency.

FIG. 7 shows a solid line and a broken line on a graph. The solid line shows a relationship between an S-parameter ($S_{11}$) and frequency when the parasitic element 30 that includes the slit 31 is provided. The broken line shows a relationship between the S-parameter and frequency when the parasitic element 30 is not provided.

As shown in FIG. 7, when the parasitic element 30 is not provided, there is one dip in the line where the $S_{11}$ decreases. When the parasitic element 30 is provided, there are two dips in the line where the $S_{11}$ decreases, showing that an additional resonance is generated. That is, by providing the parasitic element 30 with the slit 31, the parasitic element 30 resonates as an antenna.

Number of Parasitic Elements

The number of parasitic elements 30 will be described.

Figure 8:
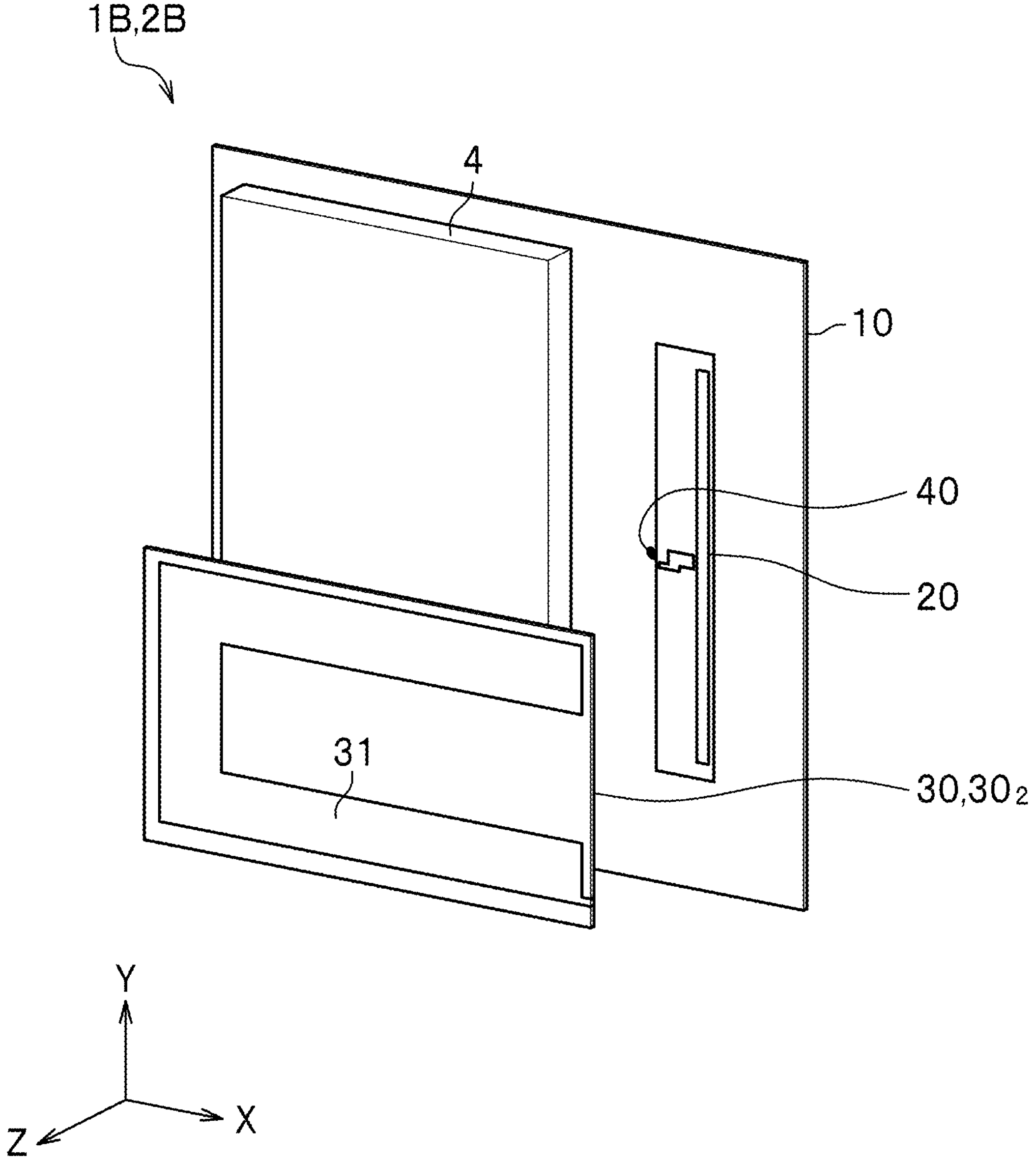
FIG. 8 is a schematic diagram of a wireless communication device that includes one parasitic element.
Figure 9:
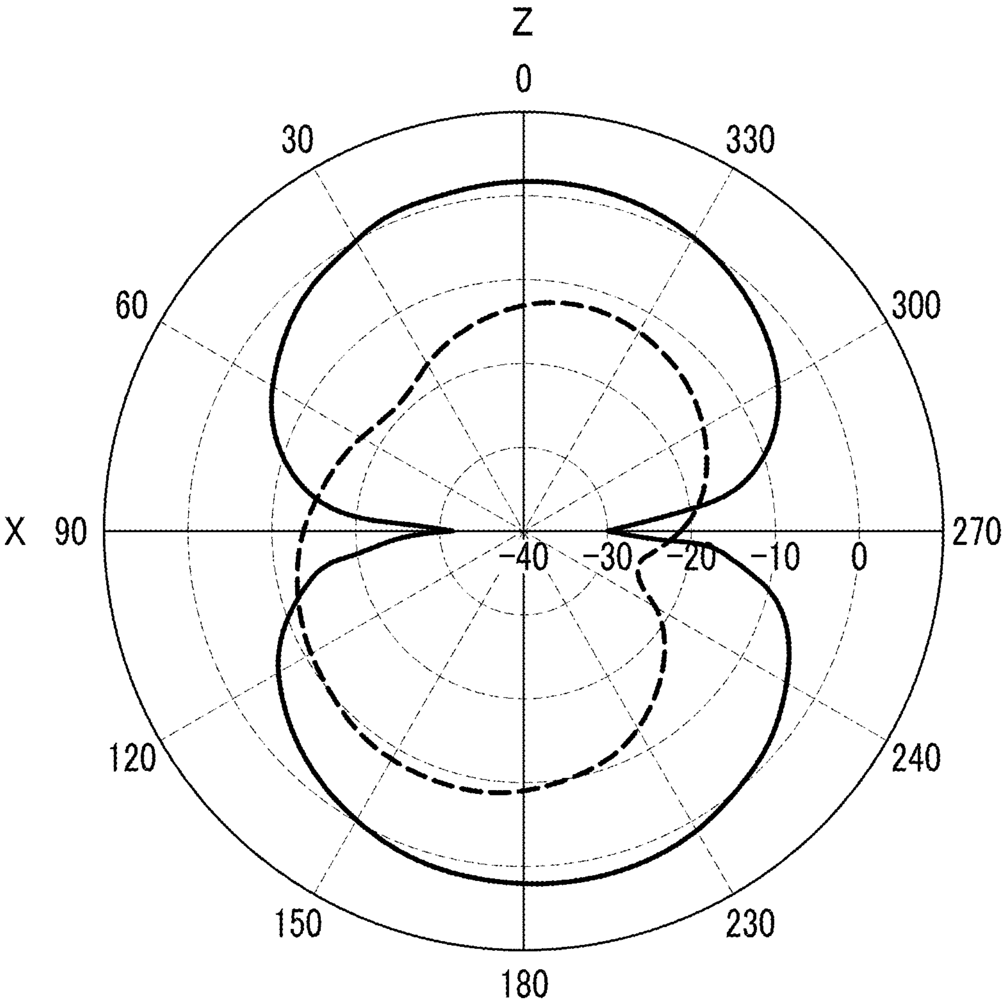
FIG. 9 is a diagram showing a radio wave radiation pattern of a slot antenna of FIG. 8.

FIG. 8 shows a slot antenna 2B and a wireless communication device 1B that include one parasitic element 30. FIG. 9 shows a radiation pattern of a radio wave of the slot antenna 2B. In FIG. 9, a solid line represents a main polarized wave (horizontally polarized wave) and a dotted line represents a cross polarized wave (vertically polarized wave) (the same applies to FIG. 11). As shown in FIG. 9, with the slot antenna 2B, the unwanted cross polarized wave is radiated in all directions.

Figure 10:
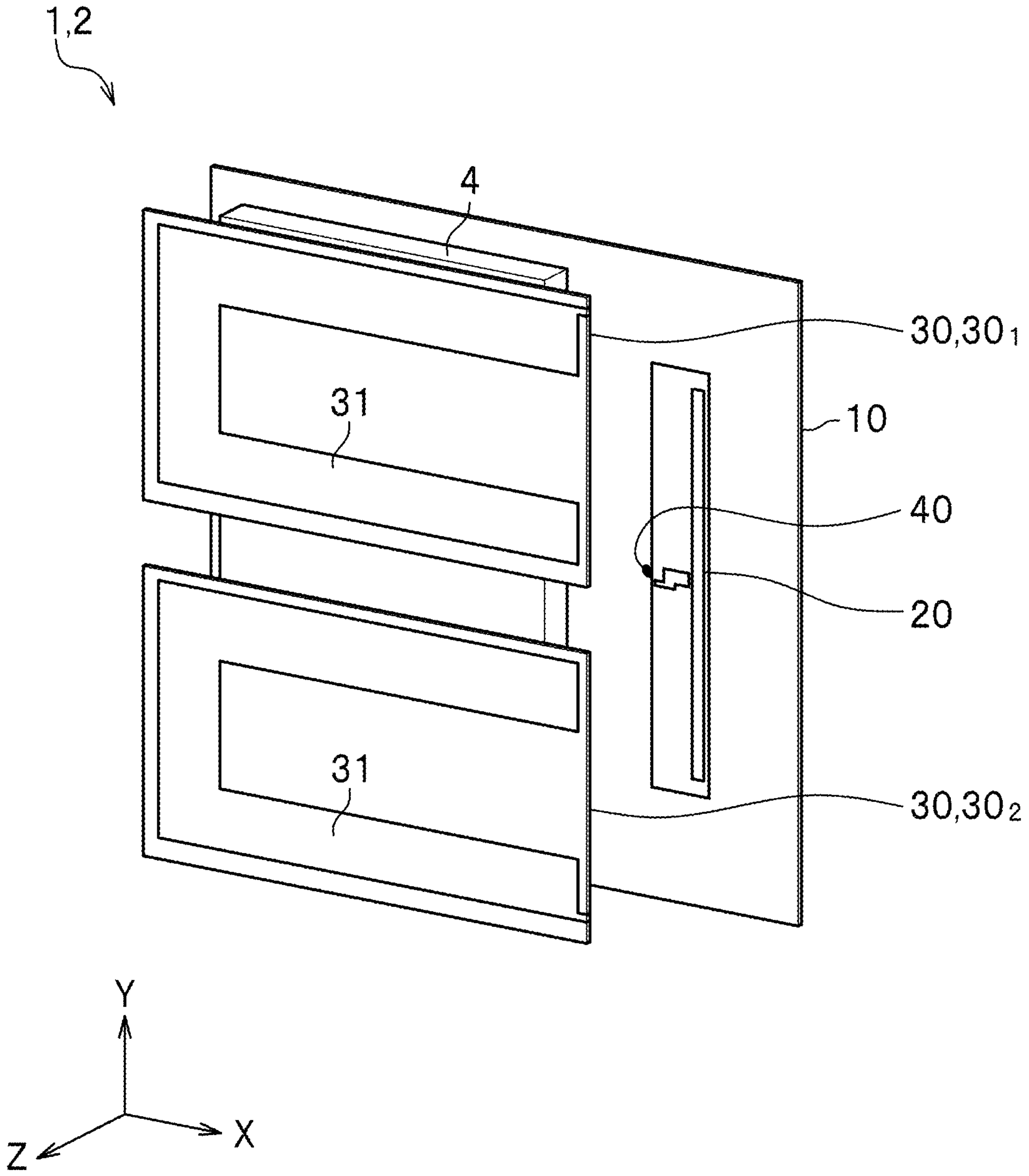
FIG. 10 is a schematic diagram of a wireless communication device that includes two parasitic elements.
Figure 11:
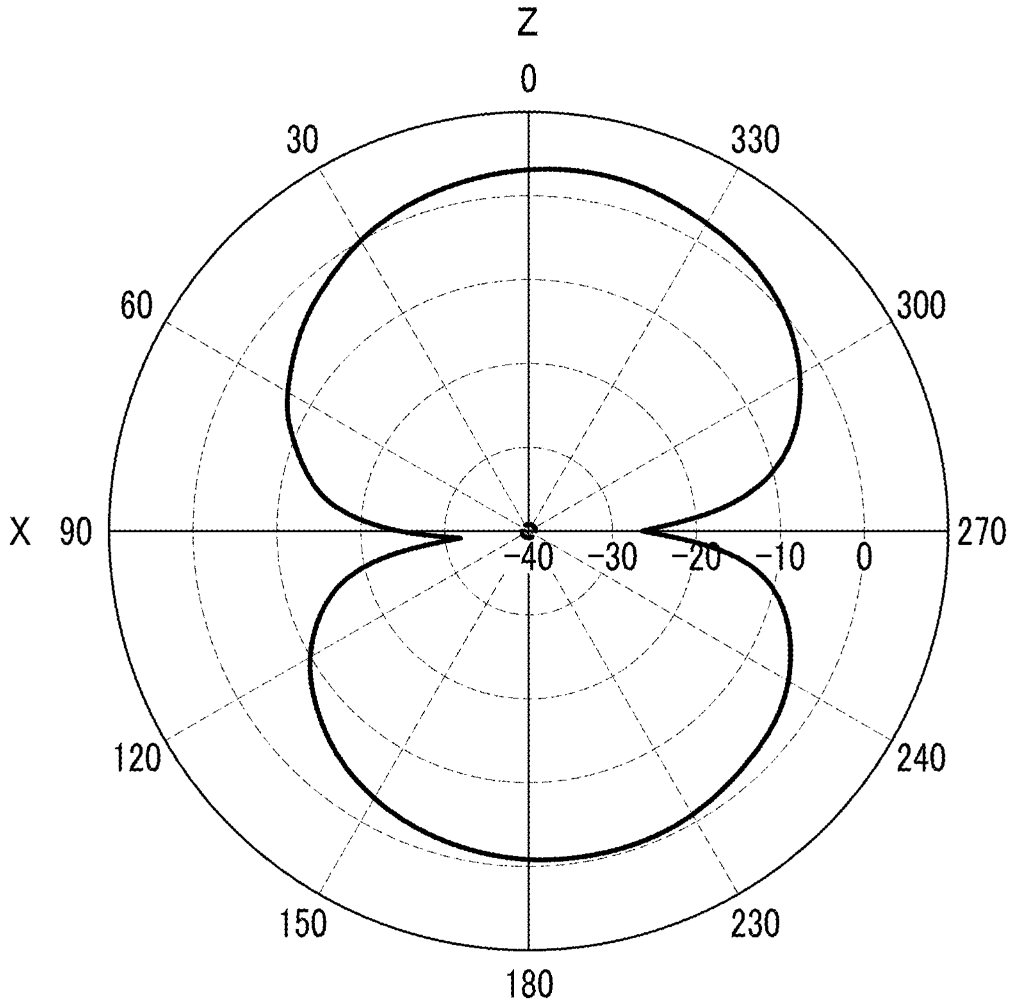
FIG. 11 is a diagram showing a radio wave radiation pattern of a slot antenna of FIG. 10.

FIG. 10 shows a slot antenna 2 and a wireless communication device 1 that include two parasitic elements 30. FIG. 11 shows a radiation pattern of a radio wave of the slot antenna 2. As shown in FIG. 11, because the two parasitic elements 30 generate electric fields in vertically opposite directions, unwanted cross polarized waves are canceled out in the slot antenna 2. The slot antenna 2 may therefore include two parasitic elements 30.

Adjustment of Phase by Inductor

A phase adjustment by the inductor 50 will be described.

Since the parasitic element 30 resonates as an antenna, it is considered that a phase of the radio wave may be adjusted by disposing an inductor 50, which may improve a characteristic of an antenna, on the slit 31. An inductance of the inductor 50 was varied from 300 nH to 800 nH, and the phase of the radio wave was measured.

FIGS. 12A to 12D show relationships between the phase and a Φ direction or a Θ direction for different values of inductance (Ind) of the inductor 50. The Φ direction represents an angle with respect to the X axis on the XY plane, and the Θ direction represents an angle with respect to the Z axis on the ZX plane (Φ=0 degrees) or the YZ plane (Φ=90 degrees) (see FIG. 1).

Figure 12A:
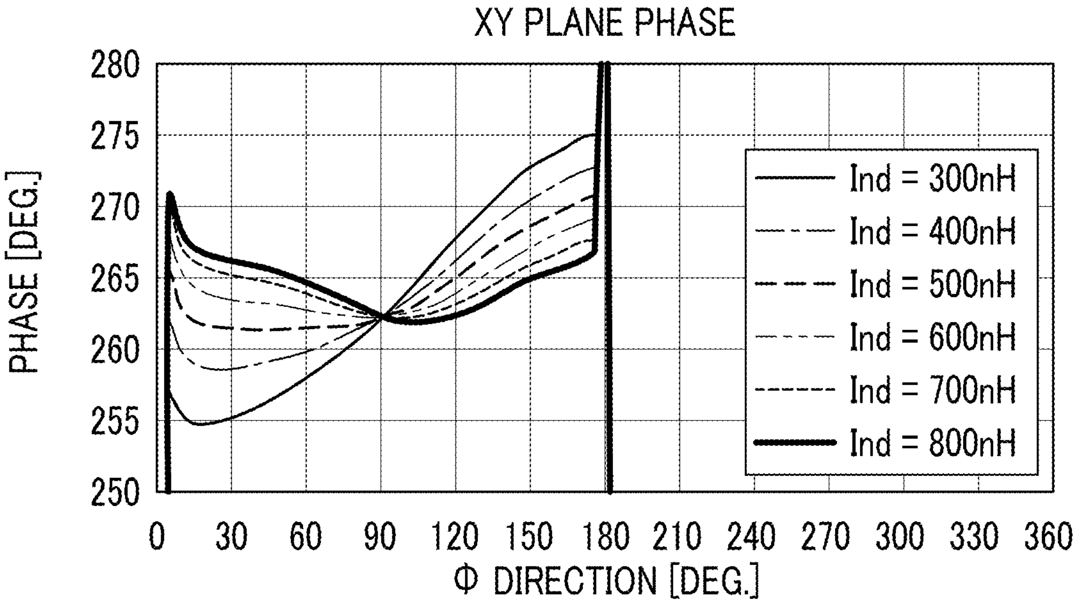
FIG. 12A is a graph showing a relationship between a phase and a Φ direction in an XY plane for different values of inductance of the inductor.
Figure 12B:
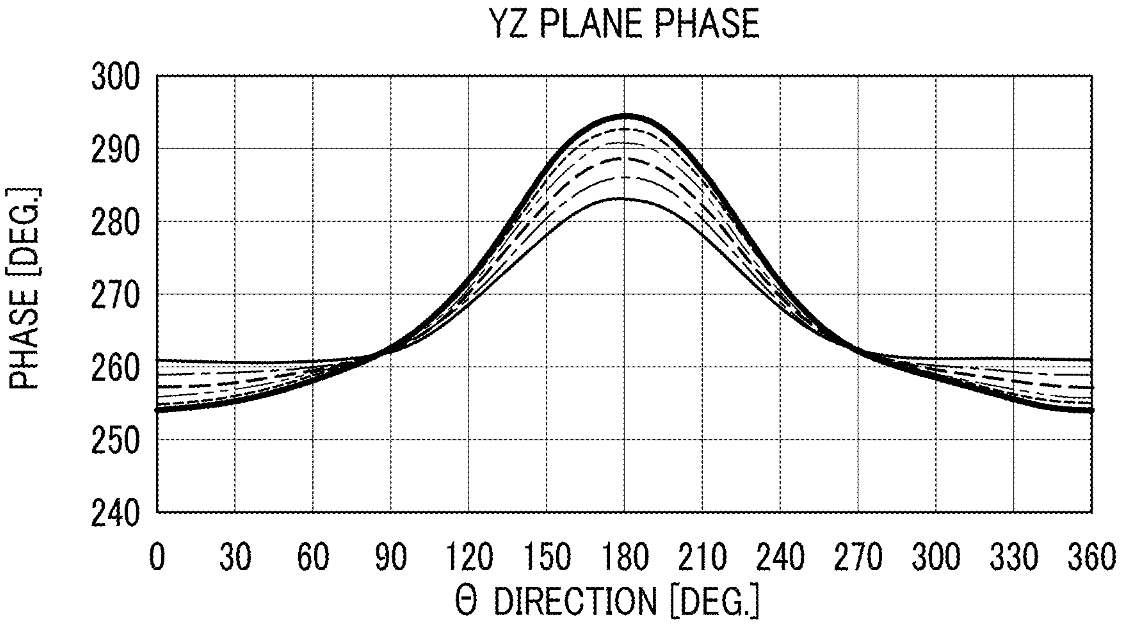
FIG. 12B is a graph showing a relationship between a phase and a Θ direction in a YZ plane for different values of inductance of the inductor.
Figure 12C:
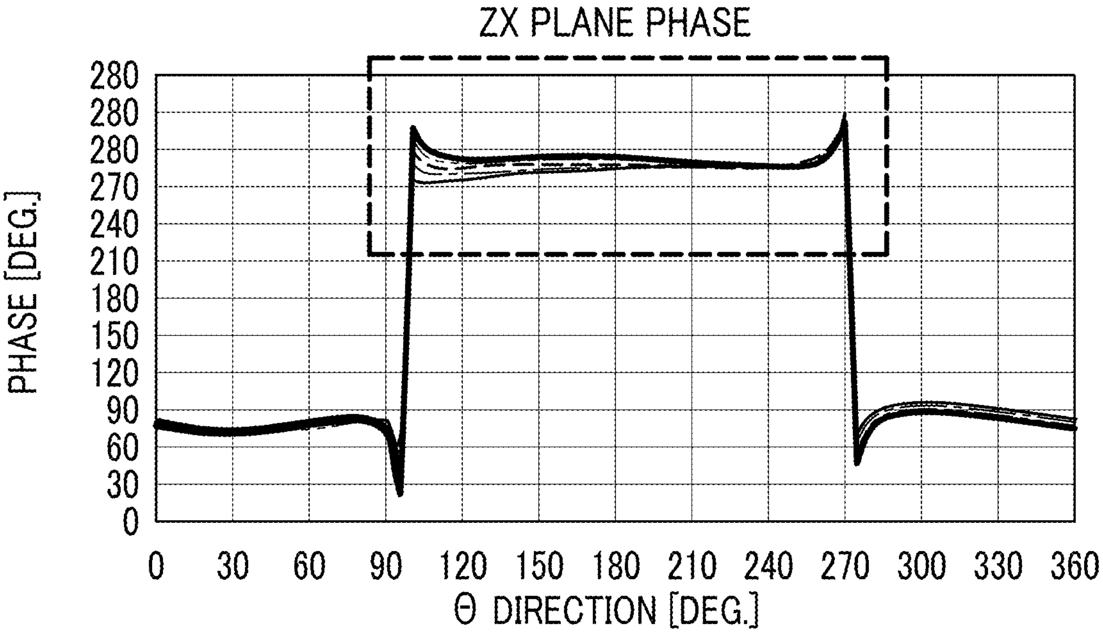
FIG. 12C is a graph showing a relationship between a phase and a Θ direction in a ZX plane for different values of inductance of the inductor.
Figure 12D:
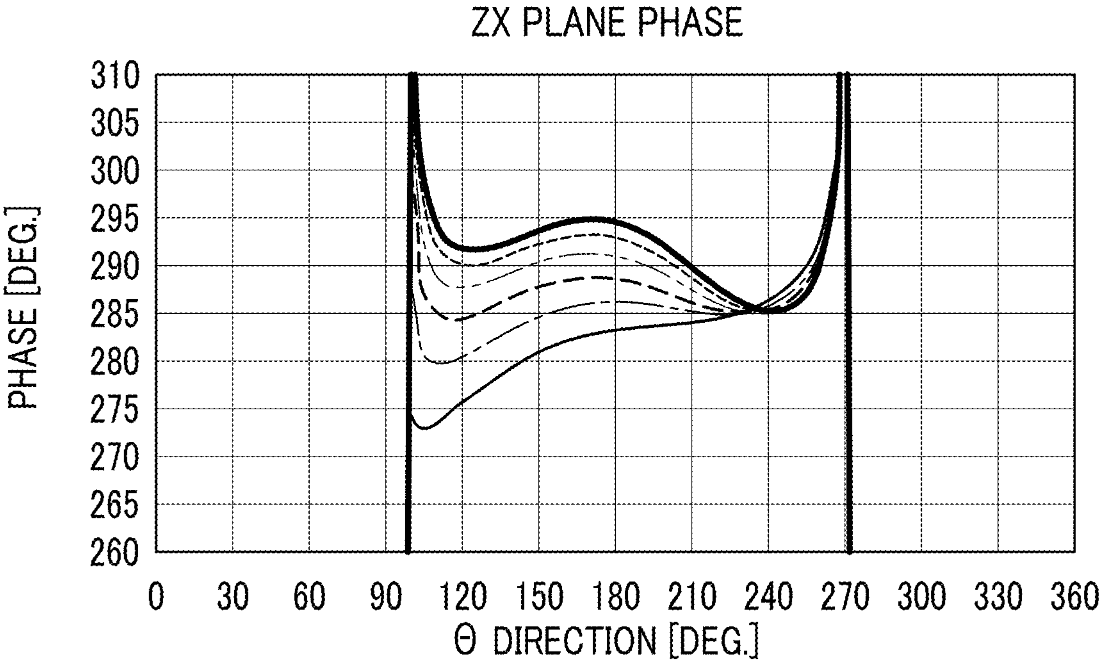
FIG. 12D is a graph showing an enlarged view of a portion surrounded by a broken line in FIG. 12C.

As shown in FIG. 12A and FIG. 12B, the slot antenna 2 may adjust the phase of the radio wave in the XY plane and YZ plane. Further, as shown in FIG. 12C and FIG. 12D, the slot antenna 2 may adjust the phase of the radio wave in the ZX plane as well. The slot antenna 2 may therefore include the inductor 50. The inductance of the inductor 50 may be between 300 nH and 800 nH.

Size of Slit

A size of the slit 31 will be described.

As shown in FIG. 6A, a height $L_{Y5}$ and a width $L_{X5}$ of the parasitic element 30 are 45 mm and 76 mm respectively. A distance $L_{Y6}$ between the parasitic element 30 and the slit 31 is 2 mm. A width $L_{Y7}$ of the gap that the slit 31 includes is 1 mm.

Figure 13A:
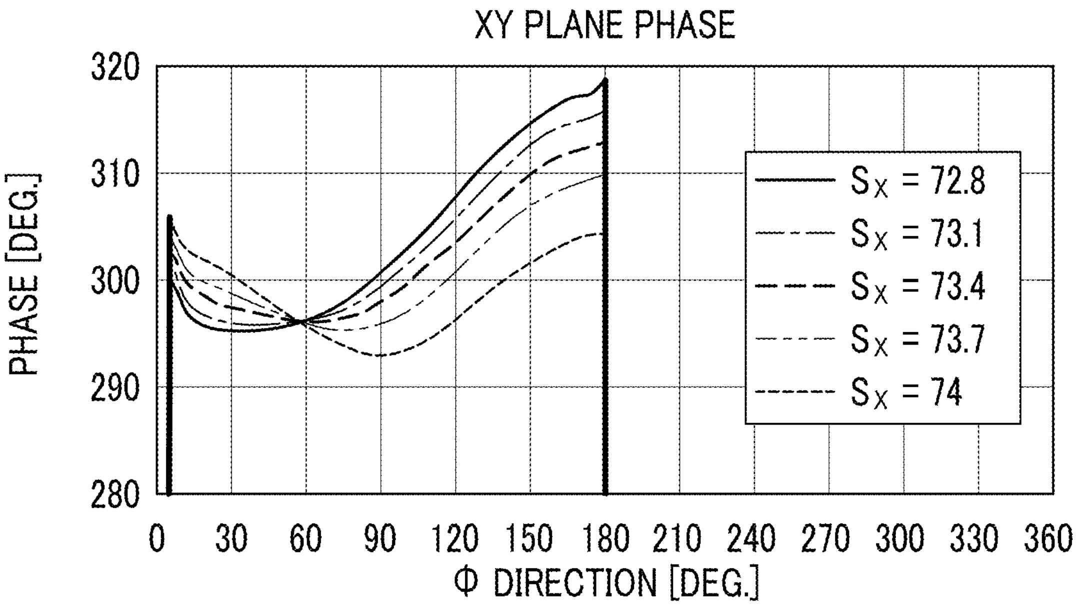
FIG. 13A is a graph showing a relationship between a phase and a Φ direction in the XY plane for different lengths of a slit.
Figure 13B:
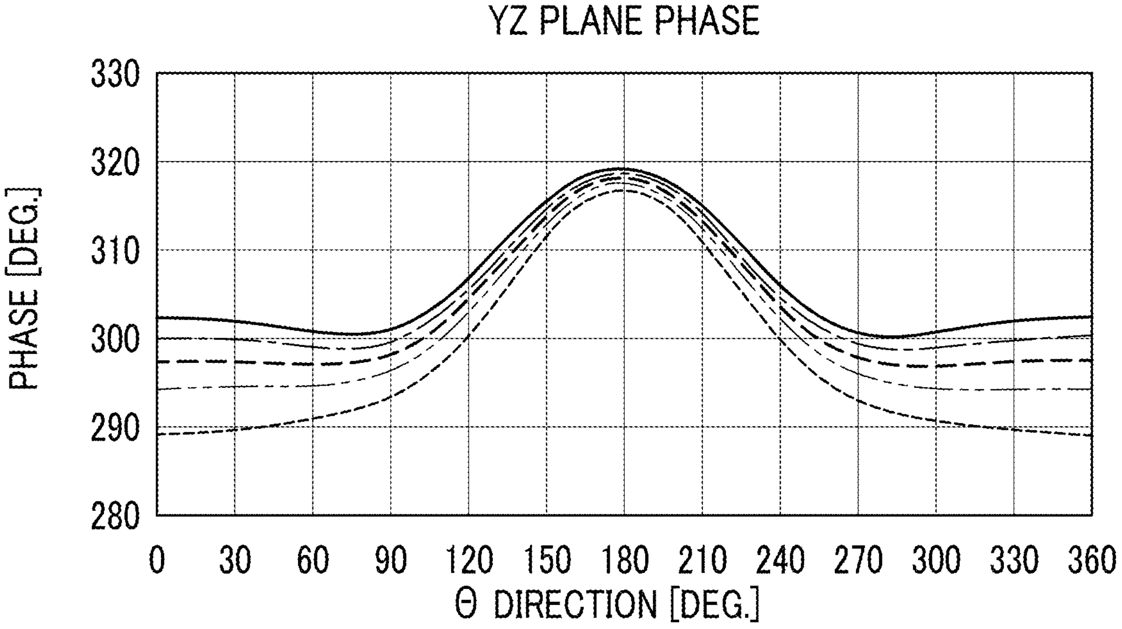
FIG. 13B is a graph showing a relationship between a phase and a Θ direction in the YZ plane for different lengths of the slit.
Figure 13C:
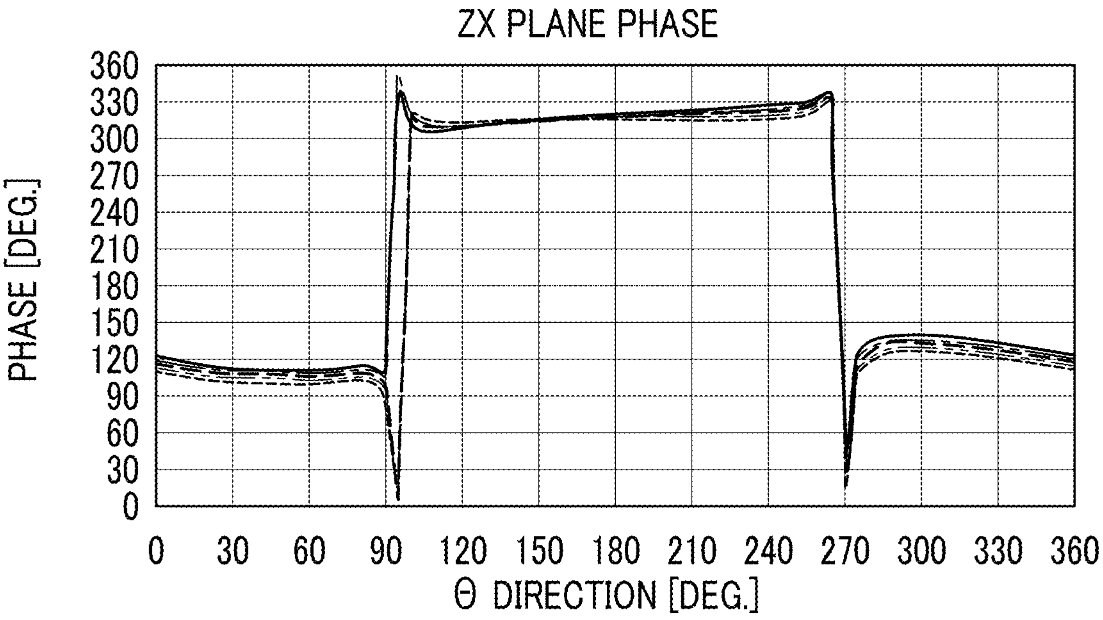
FIG. 13C is a graph showing a relationship between a phase and a Θ direction in the ZX plane for different lengths of a slit.

The phase was measured when the length $S_X$ of the slit 31 was varied from 72.8 mm to 74.0 mm while the width $S_W$ of the slit 31 was kept fixed at 12.3 mm. FIGS. 13A to 13C show relationships between the phase and the Φ direction or the Θ direction for different values of the length $S_X$ of the slit 31. As shown in FIGS. 13A to 13C, when the length $S_X$ of the slit 31 is 73.4 mm, a good phase characteristic may be achieved in the respective directions.

Figure 14A:
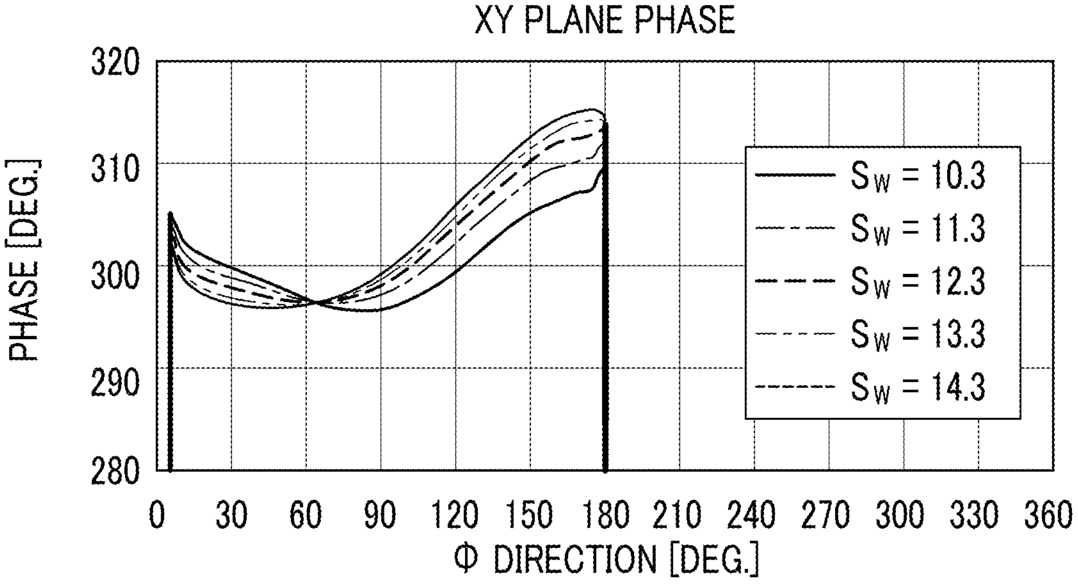
FIG. 14A is a graph showing a relationship between a phase and a Φ direction in the XY plane for different widths of the slit.
Figure 14B:
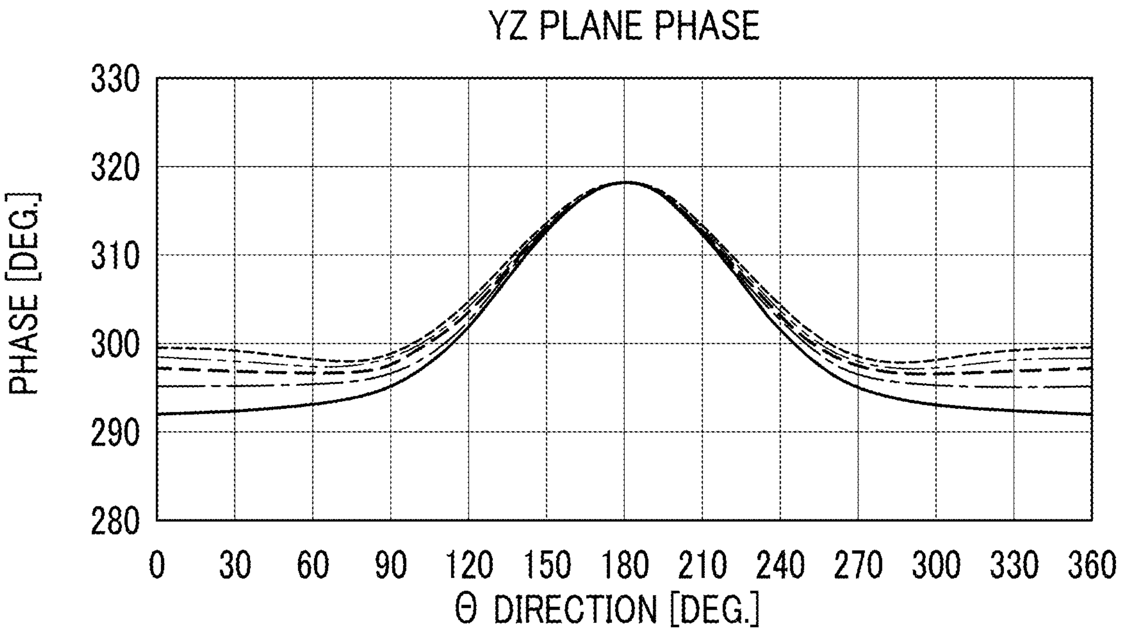
FIG. 14B is a graph showing a relationship between a phase and a Θ direction in the YZ plane for different widths of the slit.
Figure 14C:
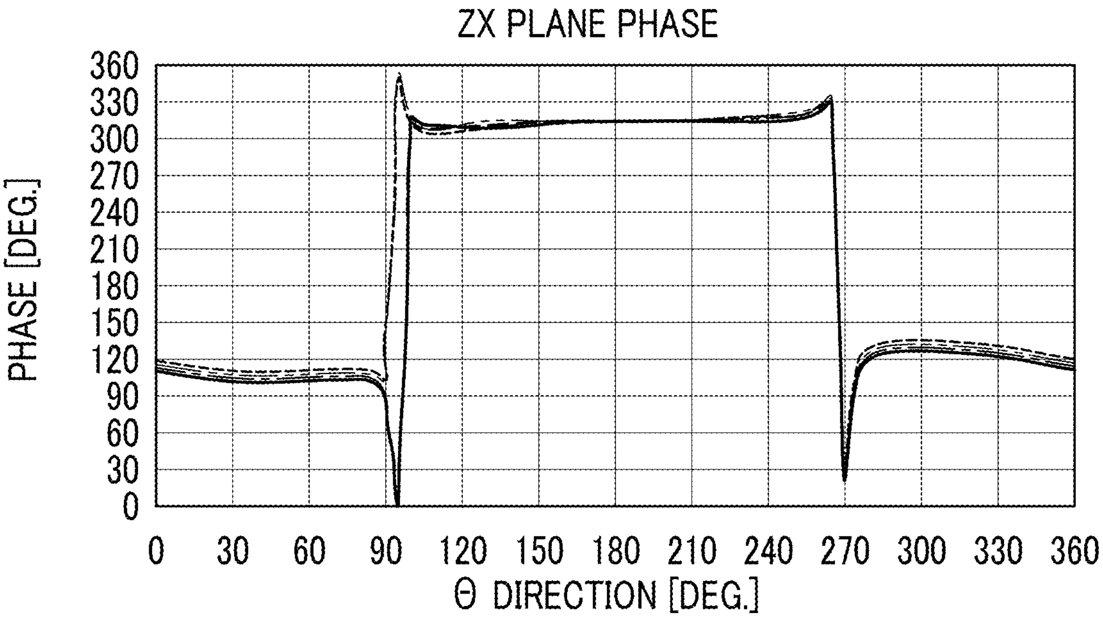
FIG. 14C is a graph showing a relationship between a phase and a Θ direction in the ZX plane for different widths of the slit.

The phase was measured when the width $S_W$ of the slit 31 was varied from 10.3 mm to 14.3 mm while the length $S_X$ of the slit 31 was kept fixed at 73.4 mm. FIGS. 14A to 14C show relationships between the phase and the Φ direction or the Θ direction for different values of the width $S_W$ of the slit 31. As shown in FIGS. 14A to 14C, when the width $S_W$ of the slit 31 is 12.3 mm, a good phase characteristic may be achieved in the respective directions.

Phase Characteristic and Gain

From the above, it may be considered that the size of the slit 31 is optimal when the length $S_X$ and the width $S_W$ of the slit 31 are 73.4 mm and 12.3 mm respectively. A phase characteristic and a gain of the slot antenna 2 were evaluated when the size of the slit 31 was optimal.

Figure 15A:
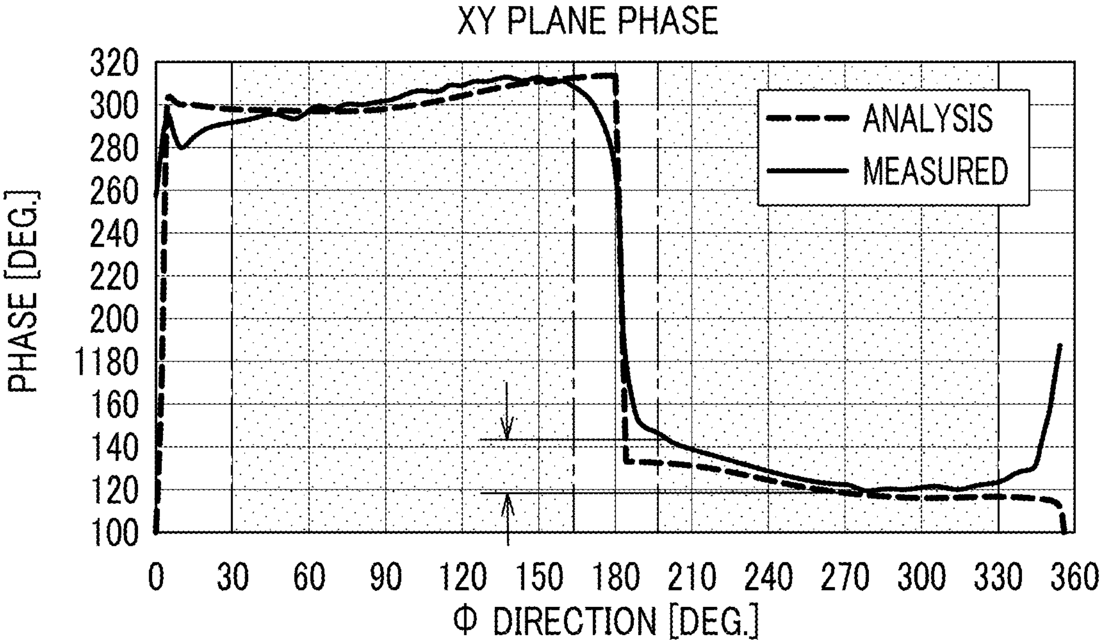
FIG. 15A is a graph showing a relationship between a phase and a Φ direction in the XY plane when a size of the slit is optimal.
Figure 15B:
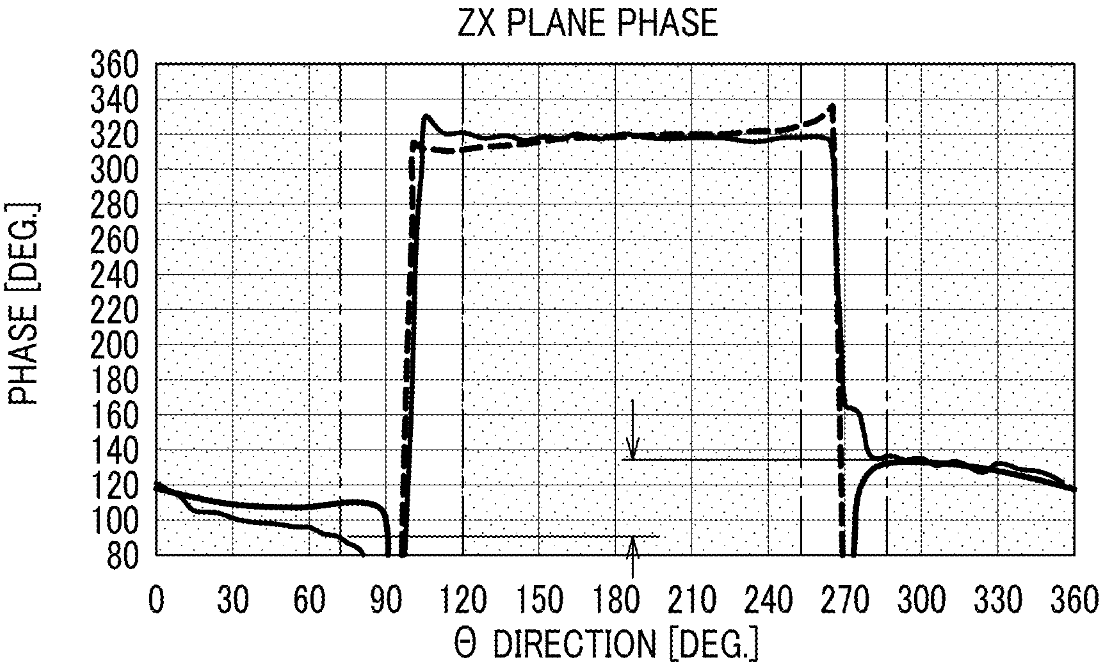
FIG. 15B is a graph showing a relationship between a phase and a Θ direction in the ZX plane when the size of the slit is optimal.
Figure 15C:
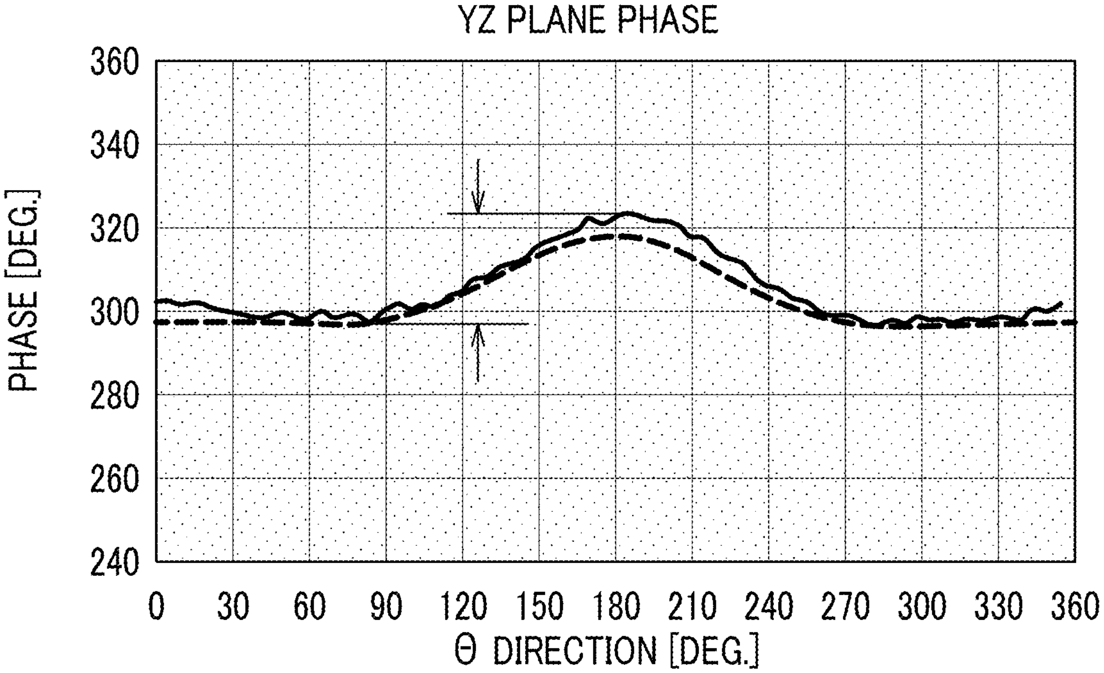
FIG. 15C is a graph showing a relationship between a phase and a Θ direction in the YZ plane when the size of the slit is optimal.

FIGS. 15A to 15C show relationships between the phase and the Φ direction or the Θ direction when the size of the slit 31 is optimal. In each of these figures, a broken line represents a result of analyzing the phase characteristic of the slot antenna 2 by a simulation, and a solid line represents a result of measuring the phase characteristic of the slot antenna 2. In FIGS. 15A to 15C, a communication range is shown by a dotted area (the same applies to FIGS. 16A to 16C).

As shown in FIG. 15A, on the XY plane, a maximum phase difference at the time of measurement was ±11 degrees in the communication range shown by the dotted area. As shown in FIG. 15B, on the ZX plane, a maximum phase difference at the time of measurement was ±18 degrees in the communication range shown by the dotted area. As shown in FIG. 15C, on the YZ plane, a maximum phase difference at the time of measurement was ±11 degrees in the communication range shown by the dotted area. Therefore, a maximum phase difference of the slot antenna 2 at the time of measurement was ±18 degrees (which, when converted into distance, is ±1.6 cm).

Figure 16A:
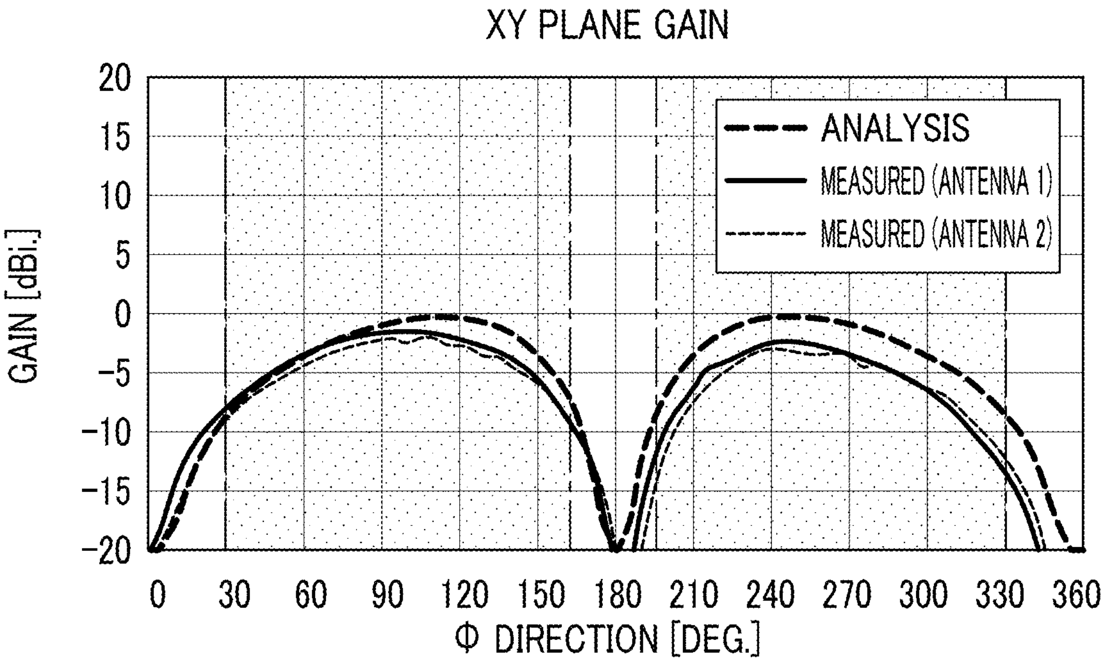
FIG. 16A is a graph showing a relationship between a gain and a Φ direction in the XY plane when the size of the slit is optimal.
Figure 16B:
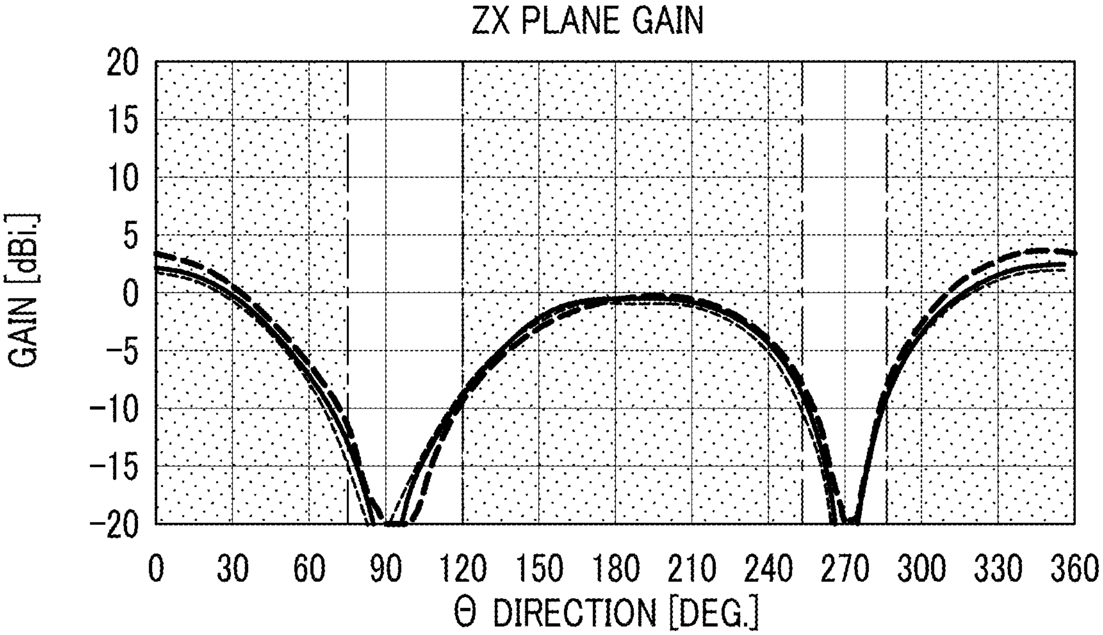
FIG. 16B is a graph showing a relationship between a gain and a Θ direction in the ZX plane when the size of the slit is optimal.
Figure 16C:
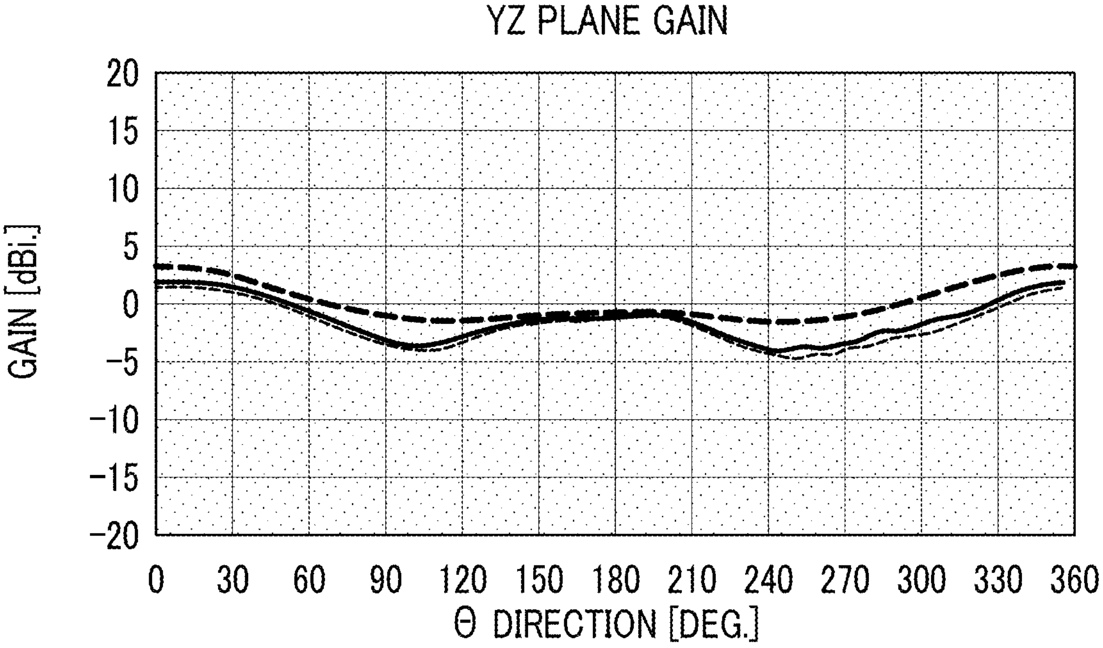
FIG. 16C is a graph showing a relationship between a gain and a Θ direction in the YZ plane when the size of the slit is optimal.

FIGS. 16A to 16C show relationships between a gain and the Φ direction or the Θ direction when the size of the slit 31 is optimal. A long-dash line represents a result of analyzing the gain of the slot antenna 2 by simulation. A solid line (antenna 1) represents a result of measuring the gain of a slot antenna 2-1. A short-dash line (antenna 2) represents a result of measuring the gain of a different slot antenna 2-2 from the slot antenna 2-1. The lines plotted for antennas 1 and 2 show respective gain measurements of two identical slot antennas 2 that were fabricated. As shown in FIGS. 16A to 16C, a maximum gain of the slot antenna 2 was 2 dBi at the time of measurement, and the slot antenna 2 has a sufficient gain. The measurement results of the antennas 1 and 2 indicate that there were no fabrication errors in the two slot antennas 2.

Although the embodiments and examples have been described in detail, the disclosure may not be limited to the above-described embodiments and examples. Design changes and the like within the scope not departing from the gist of the disclosure may also be included.

ASPECTS OF DISCLOSURE

A first aspect of the disclosure provides a slot antenna including a ground, an antenna element, and a parasitic element. The ground is sheet shaped and includes a slot. The antenna element is disposed within the slot. The parasitic element is sheet shaped and includes a slit. The parasitic element is disposed parallel to the ground.

A second aspect of the disclosure provides the slot antenna according to the first aspect, in which a sum of a length and width of the slit is greater than 2 λ/4 and less than or equal to 3 λ/4, where λ is a wavelength of a radio wave radiated by the antenna element.

A third aspect of the disclosure provides the slot antenna according to the first aspect, in which the parasitic element includes an inductor at an end of the slit.

A fourth aspect of the disclosure provides the slot antenna according to the first aspect, in which the slot antenna includes two parasitic elements. Each parasitic element is sheet shaped, includes a slit, and is disposed parallel to the ground. The two parasitic elements are arranged along a long side of the antenna element when viewed from an axis perpendicular to the ground and the two parasitic elements.

A fifth aspect of the disclosure provides the slot antenna according to the first aspect, in which the slit is formed along three sides of the parasitic element, the three sides excluding a side of the parasitic element that is closest to the slot.

A sixth aspect of the disclosure provides the slot antenna according to the first aspect, in which the parasitic element is disposed so that an end of the slit and a long side of the slot are close to each other when viewed from an axis that is perpendicular to the ground and the parasitic element.

A seventh aspect of the disclosure provides the slot antenna according to the first aspect, in which a feeding point is connected to a central portion of the antenna element.

An eighth aspect of the disclosure provides the slot antenna according to the first aspect, in which the antenna element includes a matching circuit.

A ninth aspect of the disclosure provides the slot antenna according to the first aspect, in which a length of the antenna element in a longitudinal direction is less than or equal to 0.5λ, where λ is a wavelength of a radio wave radiated by the antenna element.

A tenth aspect of the disclosure provides a wireless communication device including the slot antenna according to the first aspect and a wireless communication unit that is disposed on the ground.

What is claimed is:

1. A slot antenna comprising:

a ground that is sheet shaped and includes a slot;

an antenna element disposed within the slot; and two parasitic elements, each parasitic element being sheet shaped and including a slit, the two parasitic elements being disposed parallel to the ground, wherein the two parasitic elements are arranged along a long side of the antenna element when viewed from an axis perpendicular to the ground and the two parasitic elements.

2. The slot antenna according to claim 1, wherein a sum of a length and width of the slit is greater than 2λ/4 and is less than or equal to 3λ/4, where λ is a wavelength of a radio wave radiated by the antenna element.

3. The slot antenna according to claim 1, wherein at least one of the two parasitic elements includes an inductor at an end of the slit.

4. The slot antenna according to claim 1, wherein the slit of each parasitic element is formed along three sides of the parasitic element, the three sides excluding a side of the parasitic element that is closest to the slot.

5. The slot antenna according to claim 1, wherein each parasitic element is disposed so that an end of the slit of the parasitic element and a long side of the slot are close to each other when viewed from an axis that is perpendicular to the ground and the parasitic element.

6. The slot antenna according to claim 1, wherein a feeding point is connected to a central portion of the antenna element.

7. The slot antenna according to claim 1, wherein the antenna element includes a matching circuit.

8. The slot antenna according to claim 1, wherein a length of the antenna element in a longitudinal direction is less than or equal to 0.5λ, where λ is a wavelength of a radio wave radiated by the antenna element.

9. A wireless communication device comprising:

the slot antenna according to claim 1; and a wireless communication unit disposed on the ground.

* * * * *